United States Patent [19]
Ward et al.

[11] Patent Number: 5,586,657
[45] Date of Patent: Dec. 24, 1996

[54] SECURITY BLISTER PACKAGE

[75] Inventors: Thomas F. Ward, Madison; Grant W. Smith, Middleton, both of Wis.

[73] Assignee: Rayovac Corporation, Madison, Wis.

[21] Appl. No.: 577,504

[22] Filed: Dec. 22, 1995

[51] Int. Cl.⁶ .................................................. B65D 85/88
[52] U.S. Cl. ........................ 206/705; 53/420; 53/471; 206/459.1; 206/807; 340/572
[58] Field of Search .................. 206/459.1, 459.5, 206/461–471, 701, 703, 705, 807; 340/539, 572; 53/420, 467, 471

[56] References Cited

U.S. PATENT DOCUMENTS

| | | | |
|---|---|---|---|
| 3,408,234 | 10/1968 | Ririe, Jr. | 136/181 |
| 3,881,601 | 5/1975 | Walus et al. | 206/497 |
| 4,510,490 | 4/1985 | Anderson, III et al. | 340/572 |
| 4,534,465 | 8/1985 | Rothermel et al. | 206/485 |
| 4,723,656 | 2/1988 | Kiernan et al. | 206/333 |
| 4,816,735 | 3/1989 | Cook et al. | 320/2 |
| 4,896,770 | 1/1990 | Calcerano et al. | 206/333 |
| 4,958,731 | 9/1990 | Calcerano | 206/333 |
| 4,980,670 | 12/1990 | Humphrey et al. | 340/551 |
| 5,029,705 | 7/1991 | Schmidt et al. | 206/333 |
| 5,109,217 | 4/1992 | Siikarla et al. | 340/572 |
| 5,111,186 | 5/1992 | Narlow et al. | 340/572 |
| 5,143,215 | 9/1992 | Hartley et al. | 206/333 |
| 5,311,989 | 5/1994 | Ward et al. | 206/333 |
| 5,313,192 | 5/1994 | Ho et al. | 340/551 |
| 5,341,125 | 8/1994 | Plonsky et al. | 340/572 |
| 5,357,240 | 10/1994 | Sanford et al. | 340/572 |

*Primary Examiner*—Jimmy G. Foster
*Attorney, Agent, or Firm*—Lathrop & Clark

[57] ABSTRACT

A blister pack, particularly adaptable for use with batteries, is designed to incorporate a space for holding an electronic article surveillance sensor. The package consists of a blister of clear thermoformed plastic which has a thermoformed recess which holds the displayed product. The blister is then heat-sealed to a paperboard backing card which forms the backing of the blister pack. In order to incorporate the sensor the cavity of the blister is made deeper so the product is spaced away from the cardboard blister. This space is filled by a thin thermoformed thermoplastic tray. The tray has a surface which engages and supports the product, such as batteries, and a second surface which engages the card and a third surface which is spaced from the batteries towards the card which supports the electronic article surveillance sensor out of engagement with the batteries.

13 Claims, 3 Drawing Sheets

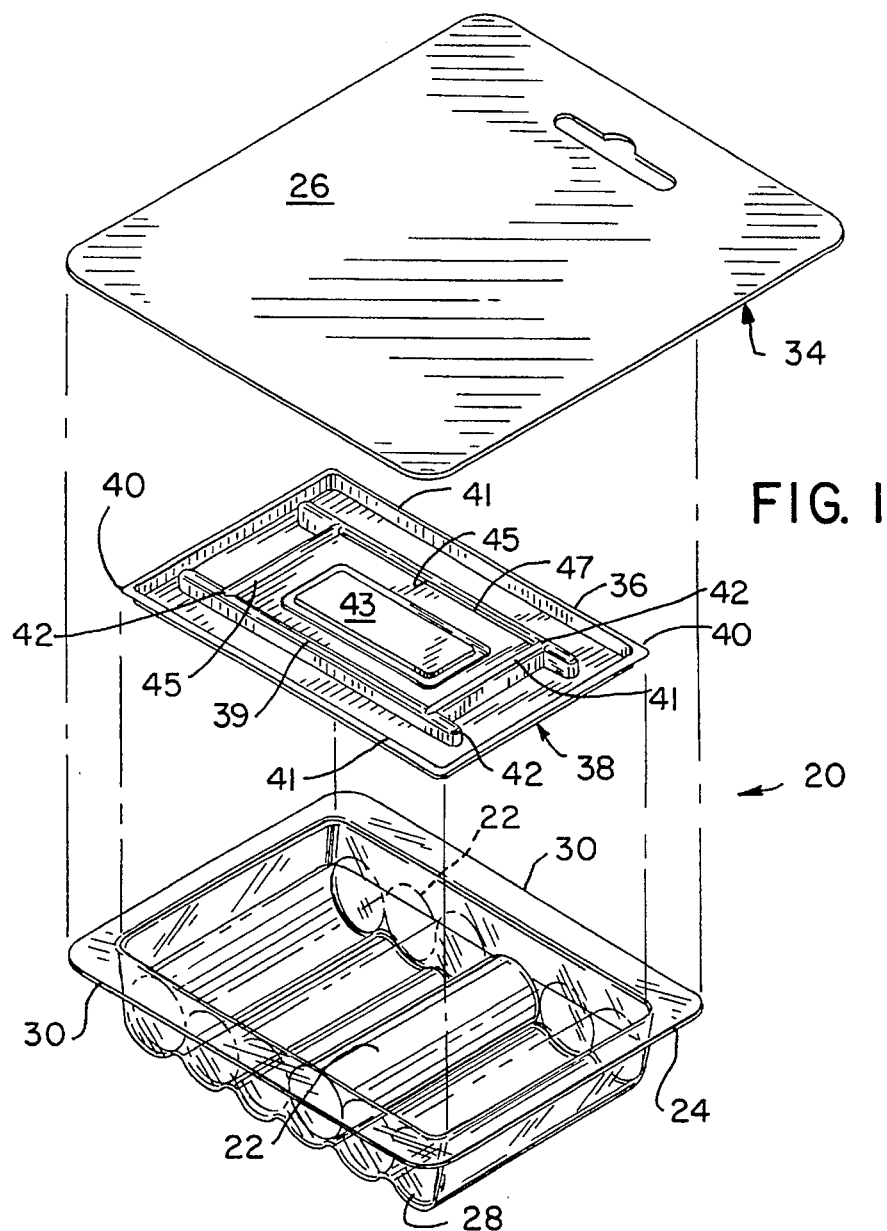
FIG. I
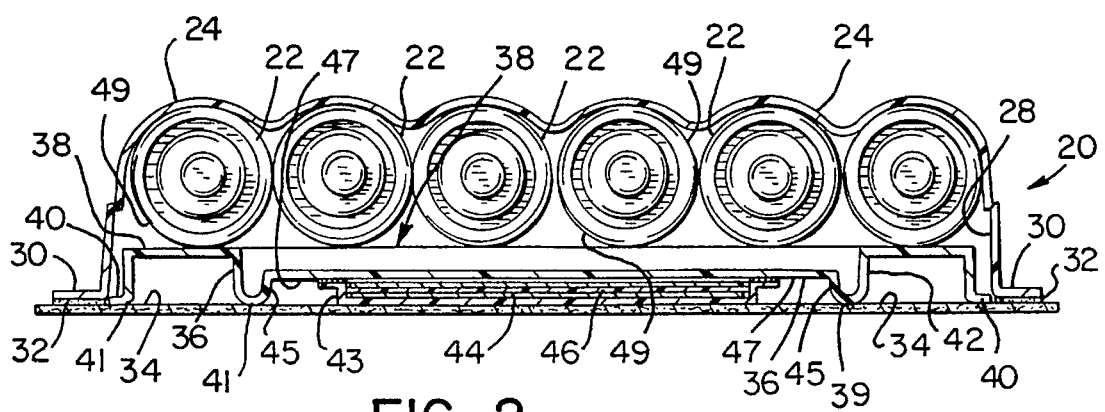
FIG. 2

SECURITY BLISTER PACKAGE

FIELD OF THE INVENTION

The present invention relates to blister packs in general and to blister packs incorporating electronic article surveillance systems in particular.

BACKGROUND OF THE INVENTION

Crimes related to retail establishments represent a serious source of loss to retailers. Although a tremendous number of shoplifters are apprehended each year, it is believed that reported occurrences of shoplifting are dwarfed by the number of undetected or unreported shoplifting events occurring each year in the United States. The cost of shoplifting is not only a significant cost for retailers, but is ultimately borne by the consumer.

Arrayed against the growth in theft is technology which has provided solutions which increase the cost or risk to the criminal perpetrators by making the perpetration of their crimes more readily detectable.

One approach to detecting shoplifting is to place a sensor which is hidden or difficult to remove on each item of merchandise. The sensors are detected at the exits of a store and assure that merchandise cannot be removed unless the merchandise is first purchased. Examples of some of the sensors which have been developed are found in U.S. Pat. Nos. 5,357,240; 5,313,192; 5,111,186; 4,510,489; and 4,510,490. For patents to related technology see U.S. Pat. Nos. 5,341,125; 5,109,217; and 4,980,670.

While it is generally desirable that the prospective thief be aware of the fact that a particular store is protected by an electronic article surveillance system, it is also desirable that the potential thief not be able to readily remove the sensor from the merchandise. In some applications this is accomplished by placing a lock on the merchandise which cannot be removed without a special key. For other types of merchandise, it is desirable that the sensor be of the disposable type which is integrally packaged with the goods. In this type of sensor it is usually desirable to hide the sensor so its location and even existence within a particular product is not readily apparent to the potential thief.

In order to cost-justify itself, the electronic surveillance sensor must be cost effectively incorporated in the packaging so the cost of preventing theft does not exceed the cost incurred by theft. Thus, as in the production of all consumer items, cost efficient manufacture is a critical objective.

With some consumer items additional problems with placing the sensor in the package result from requirements of the functionality of the sensor that it be spaced some short distance away from any metal surface in order to be detectable. The sensor should also be located where it is not likely to be crushed, as this can also interfere with its operation.

SUMMARY OF THE INVENTION

A blister pack, particularly adapted for use with batteries, is designed to incorporate a space for holding an electronic article surveillance sensor. A blister pack is one of the more cost effective means for packaging and displaying small consumer items. The package consists of a blister of clear thermoformed plastic which has a thermoformed recess which holds the displayed product. The blister is then heat-sealed to a cardboard card which forms the backing of the blister pack. In order to incorporate the sensor, the cavity of the blister is made approximately one-tenth inch deeper so the product may be spaced away from the backing card by a tenth of an inch. This space is filled by a thin plastic thermoformed tray. The tray has a surface which engages and supports the product, such as batteries; a second surface which engages the card; and a third surface spaced from the cardboard and the blister which supports the electronic article surveillance sensor.

The process of manufacturing the blister package of this invention begins with the receipt of thermoformed blisters, cards, and thermoformed sensor trays. The blisters are placed on an assembly conveyor with the cavity of the blister opening upwardly. A quantity of batteries or other consumer product is loaded into the blister. On a parallel assembly line, individual sensors are mounted to sensor trays which are then removed from the supporting plastic ribbon on which the trays are manufactured, and stacked for later use on the battery assembly line. At the battery assembly line a vacuum pick-in-place actuator removes individual sensor trays from the pre-stacked arrangement of trays and places a tray so as to overlie the batteries. A backing card is then heat-sealed to the blister, completing the package.

It is an object of the present invention to provide a receptacle within a blister pack for holding and retaining a sensor for an anti-shoplifting system.

It is another object of the present invention to provide, in a blister pack, a visually non-obvious retainer for an electronic article surveillance sensor.

It is a further object of the present invention to provide a low cost method of manufacturing a blister pack incorporating a sensor for use with an electronic article surveillance system Further objects, features and advantages of the invention will be apparent from the following detailed description when taken in conjunction with the accompanying drawings.

BRIEF DESCRIPTION OF THE DRAWINGS

FIG. 1 is an exploded isometric view of the blister pack with security sensor of this invention.

FIG. 2 is a cross-sectional view taken through the center of the assembled blister pack of FIG. 1, with the batteries shown in full, non-sectioned view.

DESCRIPTION OF THE PREFERRED EMBODIMENT

Figure 3:
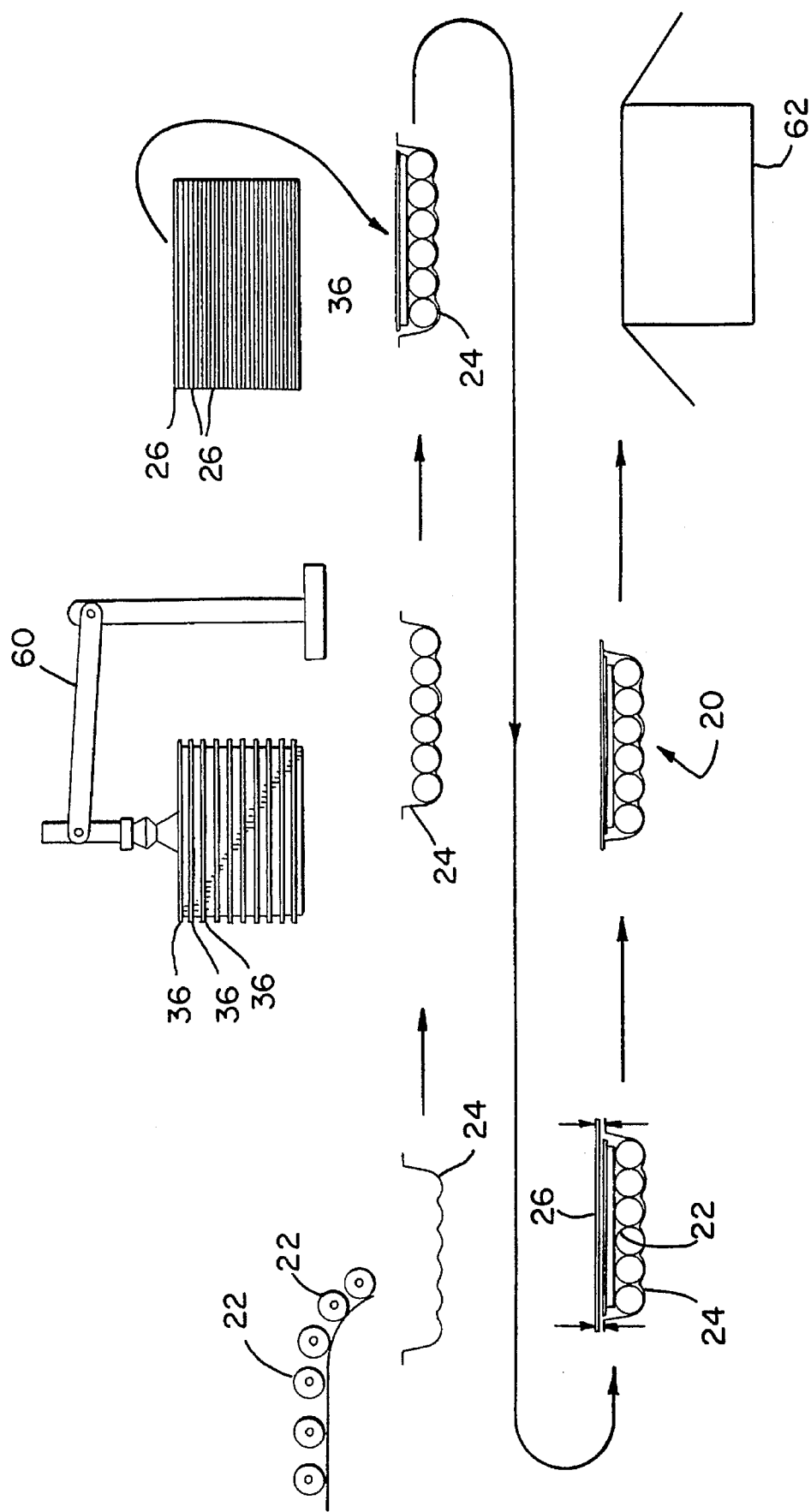
FIG. 3 is a schematic view of the manufacturing process for package of batteries of FIG. 1.
Figure 4:
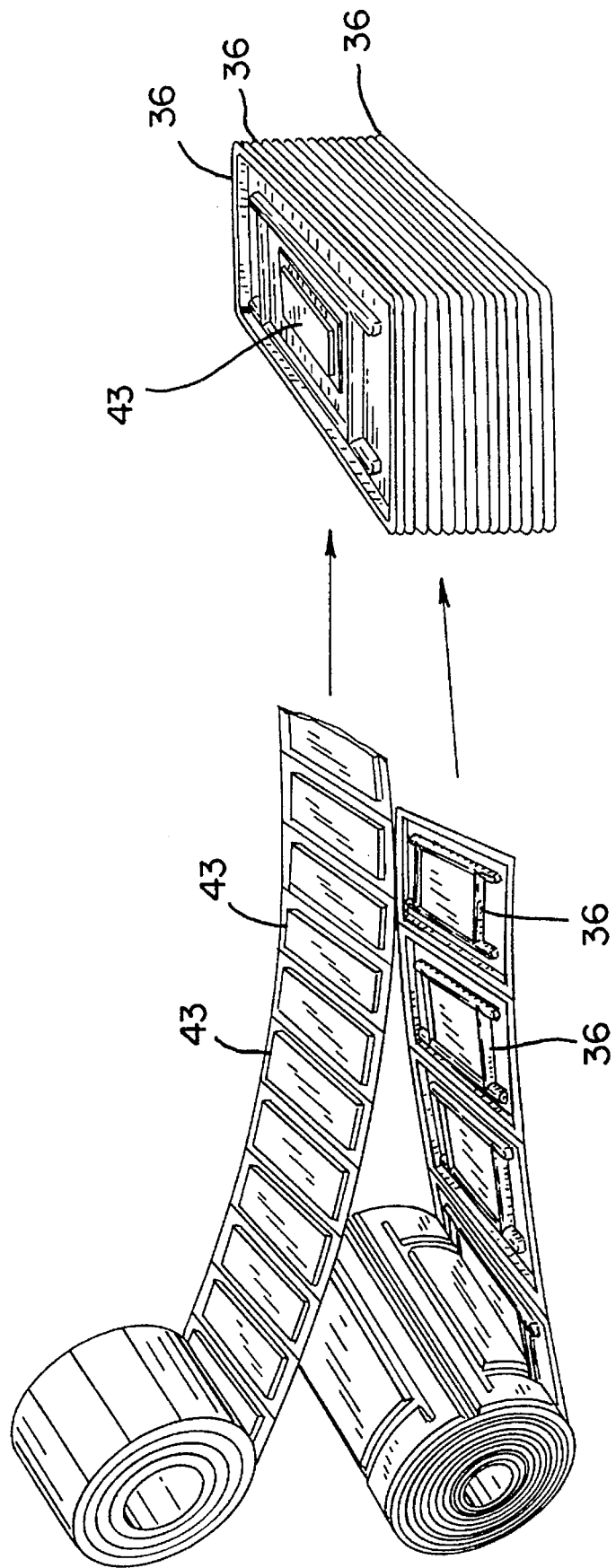
FIG. 4 is a schematic view of the manufacturing process for mounting an electronic article surveillance sensor on a tray.

Referring more particularly to FIGS. 1–4 wherein like numbers refer to similar parts, a blister pack 20 and the batteries 22 contained therein are shown in FIGS. 1 and 2. The blister pack 20 includes a blister 24 attached to a card 26. The blister has a thermoformed cavity 28 with a sidewardly extending peripheral flange 30. The peripheral flange 30 is bonded by glue-line 32 to a surface 34 of the card 26. The depth of the blister 24, as shown in FIG. 2, is sufficient to allow space for a sensor tray 36 containing a sensor 43 which is positioned between the batteries 22 and the card 26.

The sensor tray 36 nests into a portion of the blister adjacent to the peripheral flange 30. The sensor tray 36 has a first or product engaging surface 38 which faces toward the front of the blister, and a peripheral flange 40 which defines a second or card engaging surface 41. The product engaging surface 38 engages and supports the batteries 22 while the peripheral flange 40 engages the card 26. As shown in FIG. 1, the sensor tray 36 has an inner reinforcing rib 42 in the shape of a rectangle with sidewardly protruding bars, generally in the shape of a roman numeral "II." The inner rib 42 has a top 39 which also extends to and engages the card 26 and thus also defines the second surface 41. Thus the rib top 39 also provides support between the card 26 and the batteries 22. The inner rib 42 has an inner wall 45 which joins a third surfaces 47 which supports a sensor 43. The third surface 47 is recessed away from the card's surface 34, as shown in FIG. 2. The third, sensor supporting, surface 47 is also spaced from the batteries 22 to prevent the metal case 49 of the batteries 22 from interfering with the function of the sensor 43.

The third surface 47 supports the magnetic sensor 43 so that it is spaced from the batteries and held adjacent to the card 26. An exemplary sensor is the Ultra Max label manufactured by Sensormatic Electronics Corporation of 500 Northwest 12th Avenue, Deerfield Beach, Fla. 33442. The sensor 43 contains a thin film of magnetostrictive ferromagnetic material 44 which is spaced from a second hard ferromagnetic metal plate 46. The magnetostrictive material 44 is magnetically biased and thus armed by the hard ferromagnetic metal plate 46 to mechanically resonate at a pre-selected frequency. Near each exit of a store an interrogation coil sweeps through a frequency range which includes the frequency at which the magnetic sensor 43 will be induced to resonate, that is to vibrate. When the magnetostrictive material 44 vibrates, a detector connected to a receiving coil detects a change in coupling between the interrogation coil and the receiving coil and sets off an alarm. In a preferred embodiment the sensor 43 is adhesively bonded to the third surface 47 of the tray.

When a consumer takes a product to the check-out counter a de-activation device changes magnetization of the second hard ferromagnetic metal plate 46 which changes the frequency at which the magnetic sensor 43 will be induced to resonate. Thus the product may be removed from the store without triggering the detector.

The manufacture of the blister pack 20 is illustrated in FIG. 3. The blister 24, positioned with the blister opening upwardly as shown in FIG. 3, has batteries 22 loaded into the blister cavity 28. The depth of the blister cavity 28 is such as to leave a gap of about one tenth inch between the batteries and a plane defined by the blister peripheral flange 30. On an assembly parallel line, shown in FIG.4, individual sensor trays 36 are mated with self-adhesive sensors 43 which are then stacked for placement in the blister cards 26. As shown in FIG. 3, a vacuum pick-and-plane arm 60 engages individual sensor trays 36 and places them within the blister cavity 28. A blister card 26 which has a thermally activated adhesive 32 preprinted thereon is then positioned over the open blister 24 and the flange 30 of the blister 24 is then heat-sealed with a heat activated adhesive to the card 26 forming the finished package 20. The finished product 20 is then packaged in boxes 62 for shipping to customers. The package 20 of this invention is thus economically produced, avoiding folding steps and using easily assembled parts.

In many cases it will be desirable to form the sensor tray of black plastic, if the blister card has an overall dark background, in order to reduce its visual impact. The tray can be fabricated of a variety of colors as desirable to display the product and reduce the visibility of the sensor tray.

It should be understood that sensors of types other than the one illustrated and described could be used in the sensor tray with the blister pack.

It should also be understood that other battery types for example AAA, C and D could be packaged in blister packs 20.

It is understood that the invention is not limited to the particular construction and arrangement of parts herein illustrated and described, but embraces such modified forms thereof as come within the scope of the following claims.

We claim:

1. A package comprising:
   a) a means for holding articles, the article holding means being thermoformed of clear plastic and having a substantially planar flange and a cavity extending frontwardly from said flange;
   b) a means for holding a sensor for detecting shoplifting, said sensor holding means having a first surface facing the cavity in the blister which is positioned to engage articles contained in the article holding means, and the sensor holding means further having a second surface spaced rearwardly from the first surface and a third surface intermediate between said first surface and said second surface;
   c) a sensor for detecting shoplifting mounted to the third surface and thereby spaced from the articles within the package; and
   d) a means for supporting the means for holding articles, said means for supporting having a card which is bonded to the flange, wherein the card engages said second surface of said sensor support.

2. The package of claim 1 wherein the means for holding a sensor comprises a thermoformed thermoplastic tray.

3. The package of claim 1 wherein the means for holding a sensor is of a dark color.

4. The blister pack of claim 1 further comprising at least one battery supported by the means for holding articles.

5. A blister package comprising:
   a) thermoformed plastic blister, the blister having a peripheral flange and a centrally located cavity extending frontwardly from said flange;
   b) a sensor support tray, said tray having a first surface for engaging a product spaced within said blister cavity, a second surface lying substantially in the plane of the blister flange, and a third surface spaced between said first surface and said second surface;
   c) an anti-shoplifting sensor connected to said third surface; and
   c) a backing card which engages the blister peripheral flange and is adhesively bonded thereto, wherein the card further engages the second surface of the tray.

6. The blister package of claim 5 wherein the sensor support tray is thermoformed of thermoplastic material.

7. The blister package of claim 5 wherein the sensor support tray is of a dark color.

8. The blister package of claim 5 wherein the blister and the sensor support tray have draft angles about the same so the sensor tray nests in to a portion of the blister adjacent to the peripheral flange.

9. A packaged battery assembly with theft-detection features comprising:
   a) a clear thermoformed plastic blister, the blister having a peripheral flange and a centrally located cavity extending frontwardly from said flange;
   b) a plurality of batteries positioned in the blister cavity;
   c) a card which engages with and is bonded to the blister peripheral flange;
   d) a thermoformed plastic sensor support tray, said tray having a first surface which engages the batteries and positions the batteries within the blister cavity, and a second surface defined by a peripheral flange and a raised rib, the second surface lying substantially in the plane of the flange of the blister and engaging the card, and a third surface which extends from the rib and is spaced from the first surface by the rib, wherein the third surface is spaced between the second surface and the first surface, the third surface facing toward the card; and e) an electronic article surveillance sensor adhesively bonded to the third surface to be thereby spaced from the batteries.

10. The assembly of claim 9 wherein the rib is in the shape of a roman numeral "II," and the sensor is positioned within the rib.

11. The assembly of claim 9 wherein the sensor support tray is of a dark color.

12. A method of manufacturing a blister package containing a sensor for detecting shoplifting, the method comprising the steps of:

a) positioning a thermoformed blister, having a cavity and a peripheral flange surrounding the cavity, for receiving at least one article for packaging within the cavity;

b) loading the at least one article wholly within the cavity formed in the blister so as to leave a gap of about one tenth inch between the article and a plane defined by the peripheral flange;

c) picking-and-placing a tray containing a sensor for detecting shoplifting in the blister cavity so the tray does not extend above the plane defined by the peripheral flange; and d) positioning a backing card over the flange, and bonding the card to the flange to seal the package.

13. The method of claim 12 further comprising the step of bonding the sensor for detecting shoplifting to the tray prior to the positioning the tray and sensor within the cavity.

\* \* \* \* \*